US012783231B2

(12) United States Patent
Montgomery

(10) Patent No.: US 12,783,231 B2
(45) **Date of Patent: *Nov. 3, 2026**

(54) CONTINUOUS TRANSFORMATION FRAMEWORK SYNTAX

(71) Applicant: Xano, Inc., Woodland Hills, CA (US)

(72) Inventor: Sean Montgomery, Woodland Hills, CA (US)

(73) Assignee: Xano, Inc., Woodland Hills, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/623,606

(22) Filed: Apr. 1, 2024

(65) Prior Publication Data

US 2025/0165250 A1 May 22, 2025

Related U.S. Application Data

(63) Continuation-in-part of application No. 18/517,395, filed on Nov. 22, 2023.

(51) Int. Cl.
*G06F 8/72* (2018.01)

(52) U.S. Cl.
CPC .................................... *G06F 8/72* (2013.01)

(58) Field of Classification Search
CPC .................................... G06F 8/31; G06F 8/72
USPC .................................. 717/110–117, 141–144
See application file for complete search history.

(56) References Cited

U.S. PATENT DOCUMENTS

| | | | | |
|---|---|---|---|---|
| 8,943,095 | B2 * | 1/2015 | Gorman | G06F 16/367 707/771 |
| 9,083,374 | B2 | 7/2015 | Marpe et al. | |
| 9,258,225 | B2 * | 2/2016 | Hill | H04L 63/0245 |
| 10,872,095 | B2 | 12/2020 | Horowitz et al. | |
| 11,354,305 | B2 * | 6/2022 | Malak | G06F 16/26 |
| 12,073,457 | B1 * | 8/2024 | Bowman | G06Q 30/0641 |
| 2025/0165229 | A1 | 5/2025 | Montgomery | |

OTHER PUBLICATIONS

Haverbeke, “Eloquent JavaScript”, Chapter 9: Regular Expression, 3rd edition 2018, Retrieve from https://eloquentjavascript.net/3rd_edition/Eloquent_JavaScript.pdf, pp. i-x, 143-166. (Year: 2018).*

Stack Overflow, “Regex101 vs JavaScript String.match disagreement”, 2017, retrieved from http://stackoverflow.com:80/questions/28920384/regex101-vs-javascript-string-match-disagreement/, 2 pages. (Year: 2017).*

(Continued)

*Primary Examiner* — Ted T. Vo

(74) *Attorney, Agent, or Firm* — Schwegman Lundberg & Woessner, P.A.

(57) ABSTRACT

Methods, systems, and computer programs are presented for the use of a syntax framework for data transformation. A Continuous Transformation Framework (CTF) Syntax is presented that supports chainable actions that allow for continuous transformations on the original data. The CTF syntax closely resembles natural language, improves readability so code is easier to understand and read, reduces or eliminates the need for complex loops, and allows the easy traversal of arrays. The CTF framework's ability to return the original object in its transformed state enables continuous transformations and simplifies the overall process.

20 Claims, 12 Drawing Sheets

(56) References Cited

OTHER PUBLICATIONS

"U.S. Appl. No. 18/517,395, Non Final Office Action mailed Jan. 5, 2026", 9 pgs.
"U.S. Appl. No. 18/517,395, Notice of Allowance mailed Apr. 14, 2026", 7 pgs.
"U.S. Appl. No. 18/517,395, Response filed Feb. 26, 2026 to Non Final Office Action mailed Jan. 5, 2026", 17 pgs.

* cited by examiner

Continuous Transformation Framework (CTF) Syntax

- Constants
  Treat an expression as text, unless it is numerical, Boolean, null, or an expression.

- Text with spaces
  Include spaces in string

- Text with quotes
  Include delimiter to identify quotes

- Variables
  Variables are references from the global $ character.

```
value = 123
value2 = $value + 1
```

FIG. 2

```
With dot notation, fields can be referenced with an absolute path or through
array traversal

Examples:
    variable “data” = {v:1,items:[{id:2},{id:3}]}

    $data.v            # 1                   return a scalar
    $data.items        # [{id:2},{id:3}]     return an array of objects
    $data.items.0.id   # 2                   return a scalar
    $data.items.id     # [2,3]               traverse array and return an array
                                             of scalars
```

FIG. 3

- Select + Transform

```
Example
    variable "data" = {v:1,items:[{id:2},{id:3}]}

    $data|set:v:10              # {v:10,items:[{id:2},{id:3}]}
    $data|set:items:[]          # {v:1,items:[]}
    $data|set:items.0.id:8      # {v:1,items:[{id:8},{id:3}]}
    $data|set:items.id:9        # {v:1,items:[{id:9},{id:9}]}
```

FIG. 4

- Special variable $n is used to reference a selection within an expression
  $n accesses the nth element in the expression data
```
{
"v": 10,
  "items": [
    {"id": 1,
     "name": "s1",
     "score": 100,
     "tags": [
        {"tag":"beta","weight":5},
        {"tag":"test","weight":50}
      ]
    },
    {"id": 2,
     "name": "x9",
     "score": 87,
     "tags": [
        {"tag":"abc","weight":10},
        {"tag":"def","weight":90}
      ]
    }
  ]
}
```

expression1

- Pipes

Pipes chain functions where the structure of the initial input is passed along the chain of functions and each function may access, transform, and select values inside the initial input. Arguments to pipes are separated using a ":"

  ```
  "sean"|upper|at:0|lower # s
  ```

Arguments of pipes can be wrapped within parenthesis.

  ```
  "sean"|upper|at:(0|inc)|lower # e
  ```

- Nested conditional select allows the selection of data based on conditions. It can be used within a pipe chain.

Example: Retrieve all tags from a single array with an item > 95

  ```
  $data.items[$$.score>95].tags.tag
  $data.items|get:[$$.score>95].tags.tag
  $data|(get:items)|(get:[$$.score>95])|get:tags.tag
  ```

- Transformations return original data regardless where the transformation is taking place. This allows chaining.

Example variable "data" = {v:1,items:[{id:2},{id:3}]}

  ```
  $data|set:v:10|set:items.0.id:8 # {v:10,items:[{id:8},{id:3}]}
  ```

FIG. 7

Complex Example variable “data” = {v:1,items:[{id:2,name:”a”},{id:3,name:”b”},{id:4,name:”c”}]}

Perform following operations:
- Increment v by 10
- Filter the items array to include items with an id greater than or equal to 3
- Upper case name entry of each item
- Transform the array into an array of objects of just name?

```
  $.data
|set:v:$$+10
|set:items:($$|filter:$$.id >= 3)
|set:items.name:($$|upper)
|set:items:($$|pick:[“name”])

                # {v:11,items:[{name:”B”},{name:”C”}]}
```

FIG. 8

Complex multi-step transform example

```
var data =
        {v: 1, alias: "sean",
        items: [{id: 1, name: "apple", score: 90,
                        tags: [{tag:"brown",weight:10},{tag:"silver",weight:20}]},
                   {id: 2, name: "pear", score: 100,
                        tags: [{tag:"red",weight:30},{tag:"gold",weight:40}]}]}
```

Operations:

- Increment v by 10
- Filter the items array to include items if id >= 2
- Upper case name entry of each item
- Transform tags array into array of objects of tag uppercased if weight > 35

```
$data
  |set:v:$$+10
  |set:items:($$|filter:$$.id >= 2)
  |set:items.name:($$|upper)
  |set:items.tags:(
     $$|filter:$$.weight>35|pick:["name"]|set:name:($$|upper)
)
```

FIG. 9

CONTINUOUS TRANSFORMATION FRAMEWORK SYNTAX

CROSS-REFERENCE TO RELATED APPLICATIONS

This application is a Continuation-in-part Application of U.S. patent application Ser. No. 18/517,395, entitled "Continuous Transformation Framework Syntax," filed on Nov. 22, 2023, and is herein incorporated by reference in its entirety.

TECHNICAL FIELD

The subject matter disclosed herein generally relates to methods, systems, and machine-readable storage media for an improved programming syntax that is more compact, easy to read, and includes chainable actions.

BACKGROUND

Programming languages have continuously evolved over the last few decades. However, existing programming languages have complex syntaxes that allow only expert computer programmers to create, understand, and debug code. Other problems include the large number of lines needed to code tasks, the long time required to write code, difficulty in collaborating with other users who are not familiar with some blocks of code, difficulty in analyzing code to find bugs, etc.

BRIEF DESCRIPTION OF THE DRAWINGS

Various appended drawings illustrate examples of the present disclosure and cannot be considered limiting its scope.

FIG. 2 illustrates the Continuous Transformation Framework (CTF) syntax according to some examples.

FIG. 3 illustrates the use of the CTF selector according to some examples.

FIG. 4 illustrates the use of the CTF selector combined with a transformation, according to some examples.

FIG. 7 illustrates the syntax for pipes, according to some examples.

FIG. 8 illustrates a complex example that uses the CTF syntax, according to some examples.

FIG. 9 illustrates another complex example that uses a multi-step transform, according to some examples.

DETAILED DESCRIPTION

Example methods, systems, and computer programs are directed to a syntax framework for data transformation that enhances readability and reduces complexity. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

A Continuous Transformation Framework (CTF) Syntax is presented that supports chainable actions that allow for continuous transformations on the original data. The CTF syntax closely resembles natural language, improves readability so code is easier to understand and read, reduces or eliminates the need for complex loops, and allows the easy traversal of arrays. Further, the CTF syntax allows the presentation of more of the program's logic on a display, which is very helpful when viewing logic in devices with small displays. Also, it allows the easier editing of program code on smaller devices (e.g., mobile phones) because the CTF syntax requires fewer characters than traditional programming languages. The CTF framework's ability to return the original object in its transformed state enables continuous transformations and simplifies the overall process.

Figure 1A:
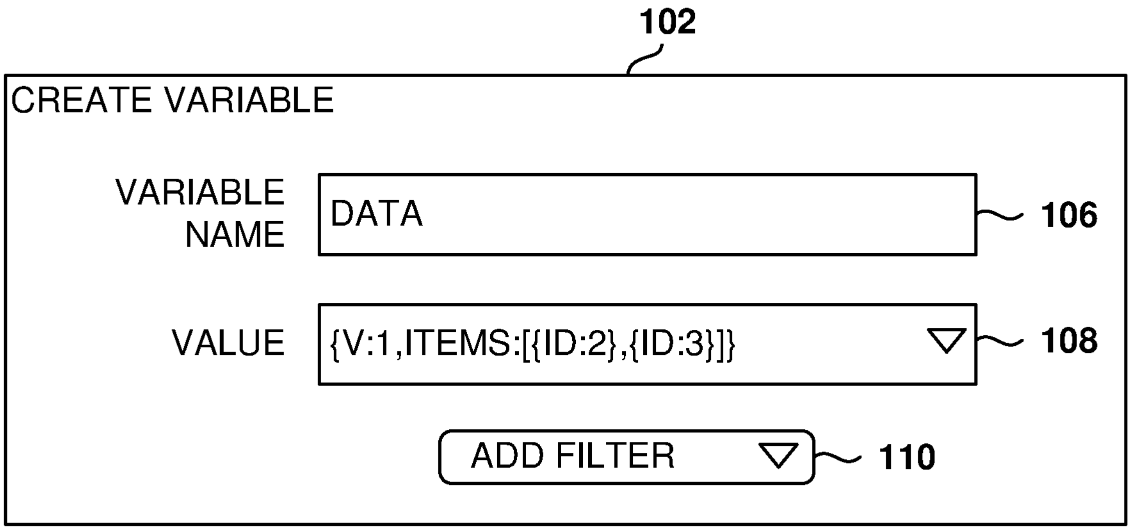
FIGS. 1A-1B show a sample user interface (UI) for generating code, according to some examples.
Figure 1B:
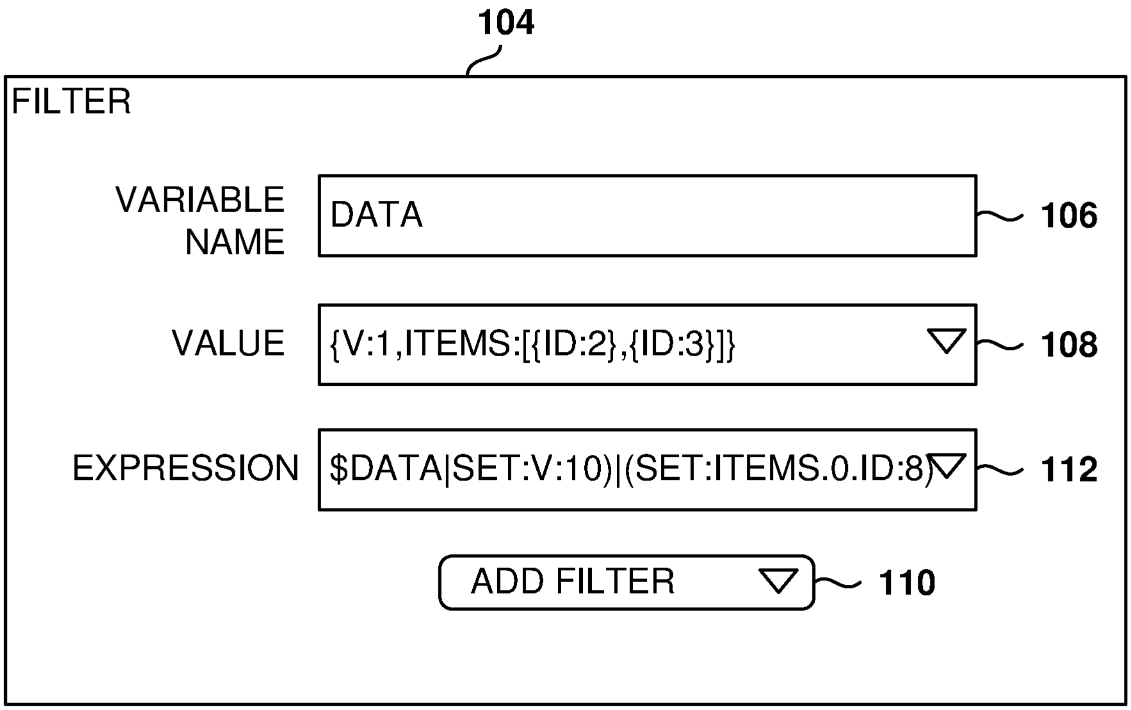

FIGS. 1A-1B show a sample user interface (UI) 102 for generating code, according to some examples. The UI 102 includes options for entering instructions to create CTF code. Instead of using a text editor to write code, a developer may use the UI 102 to enter information, such as variables, functions, transformations, etc.

Although the UI 102 is shown for a guided utility to create code, the CTF instructions may also be created with other tools, such as integrated development environments, text editors, Artificial Intelligence (AI) models (e.g., a Large Language Model), etc. Additionally, the CTF code may be used for many purposes, such as for input to compilers to generate machine code, input for interpreters, use as a browser add-in, integration with another type of code (e.g., JavaScript), mobile app development, etc.

In the UI 102, the user has selected the option to create a variable. Field 106 is for entering the variable name, and field 108 is for entering a value for the variable. In the illustrated example, the user has created a variable named data, and the value for data, expressed in CTF format, is {v:1,items:[{id:2},{id:3}]}. Thus, the variable data includes a first field v, and an array named items with two components, a first one with an id of 2 and a second one with an id of 3.

A menu 110 provides options to enter additional instructions. In this example, the user has selected to add a filter, and the result is shown in UI 104 of FIG. 1B. Field 112 has been added to enter an expression to access the variable data, and the expression is $data|(set:v:10)|(set:items.0.id:8). When the program is executed, the result of applying this expression to the variable data would be updating V and items.0.id, resulting in updating data to {v:10,items:[{id:8}, {id:3}]}. More details on the syntax for the CTF code are provided below.

FIG. 2 illustrates the Continuous Transformation Framework (CTF) syntax, according to some examples. The CTF syntax is a new syntax that is easier to read and understand than existing programming syntaxes. Also, the CTF syntax is more compact, with savings of 50% or more in the number of characters required to program tasks as compared to existing syntaxes. The CTF syntax results in smaller files because less verbose code may result in fewer characters, which can decrease the time needed for file transfers, version control operations, and other file-related tasks. Further, more compact program instructions mean that the instructions are easier to parse and can be processed faster.

Furthermore, the CTF syntax supports chainable actions, meaning that a pipe operation returns the original input root object in a transformed state so the transformed root object can be transformed again. More details on the implementation of pipes are provided below with reference to FIG. 7.

A programming syntax is a set of rules that define the structure of a programming language, acting as the grammar of the programming language and defining how instructions for the programming language should be provided so the compiler or interpreter can process the code to provide the desired result.

The Continuous Transformation Framework (CTF) syntax offers a suite of benefits that are readily apparent to those skilled in the art of computer programming. Foremost among these is its ease of comprehension; the syntax is designed to be intuitive and akin to natural language, which significantly diminishes the learning curve and error rate for developers. This user-friendly nature of the CTF syntax not only makes the code more accessible but also facilitates a more collaborative environment where developers can work together more seamlessly.

Moreover, the CTF syntax contributes to more compact code. It enables developers to express programming constructs in fewer lines, leading to more concise and efficient code. This compactness is not just a matter of brevity; it translates directly into improved productivity as developers can write code more swiftly, thereby accelerating the development process.

In terms of maintenance, the reduced complexity inherent in the CTF syntax simplifies ongoing code management and future updates. This simplicity is also a boon for error handling; the straightforward nature of the syntax makes it easier to pinpoint and rectify coding mistakes, which can significantly cut down on debugging time.

Performance-wise, the efficiency of the CTF syntax is a key attribute. It optimizes code execution, resulting in programs that run faster and more smoothly. Additionally, the brevity of the CTF syntax leads to a reduction in file sizes. With more compact instructions, the files occupy less storage space and can be transmitted more rapidly across networks, which is particularly advantageous in environments where bandwidth or storage is at a premium.

Embodiments of the CTF syntax, as would be recognized by those of ordinary skill in the art, include its application in various programming environments and scenarios. For instance, the syntax could be implemented within integrated development environments (IDEs) to enhance code readability and reduce the cognitive load on programmers. It could also be employed in educational tools to teach programming concepts more effectively. Furthermore, the CTF syntax could be adapted for use in mobile app development, where screen real estate is limited, and the need for concise code is paramount. These embodiments underscore the versatility and practicality of the CTF syntax in the field of software development.

Elements of the CTF syntax are described below. Other elements of the CTF syntax not explicitly described below are the same as other programming languages, such as JavaScript. For example, functions in JavaScript, such as alert, mul, console.log, setInterval, etc., may also be used with the CTF syntax.

The following syntax elements are described below: constants, text, variables, selection from data structure, pipes, transformations, use of special variables for selection, and multiple selections.

With reference to constants, the CTF syntax treats an expression as text unless it is numerical, Boolean, null, or an expression. This reduces the requirement of having to include quotation marks. Below are a few examples with explanations:

value=sean # assign the string “sean” to the variable value value=“sean” #assign the string “sean” to the variable value value=123 # numerical-assign the integer 123 to the variable value value=“123” # assign the string “123” to the variable value value=true # boolean-assign the boolean true to the variable value value=“true” # assign the boolean “true” to the variable value value=false # boolean-assign the boolean false to the variable value value=“false” #assign the string “false” to the variable value value=null # null-assign null to the variable value value=“null” #assign the string “null” to the variable value For text with embedded spaces, the spaces are included in the string. Below are examples for entering text with embedded spaces:

value=sean is here # assign the string “sean is here” to the variable value value=“sean is here” # assign the string “sean is here” to the variable value For text with embedded quotes, the delimiter “\” is included to identify the quotes. Below are examples for entering text with embedded quotes:

value=‘sean is here’ #“‘sean is here’”

value=sean is “here #“sean is \” here”

value=\“sean is here # “\” sean is here”

The value of a variable is referenced by using the $ character followed by the name of the variable. For example:

$$\text{value} = 123$$

$$\text{value2} = \$\text{value} + 1$$

Another example with variables named input, env, and col:

$$\text{input} = 123$$

$$env = 2$$

$$col = 3$$

$$\text{value} = \$\text{input} + \$env + \$col + 1$$

Thus, these variables are referenced as $.input, $.env, and $.col.

Data structures with types defined within may be used for variables. Common types include inputs, environment variables, and columns. The element inside the variable is referenced by using a “.” after the variable name, such as:

```
input {
  int id
}
value = 123 + $input.id
```

In this example, the variable input is defined as including an integer named id, and its content is referenced as $input.id.

FIG. 3 illustrates the use of the CTF selector according to some examples. Dot notation is used to indicate a selection, e.g., to access the properties and methods of objects. It is a simple and concise way to navigate through complex data structures. To use dot notation, the name of the object is followed by a period, and then the name of the property or method is used to indicate the desired access. For example, if there is an object called person with a property called name, person.name can be used to access the name property.

With dot notation, fields can be referenced with an absolute path or through array traversal. When traversing an array, the result will be an array, even if the instruction references a scalar within the array, because traversing an array will return as many values as the length of the array.

For example, given variable data={v:1,items:[{id:2},{id:3}]}, to access field v within data, $data.v is used. The following is a list of examples to access the variable data:

| | | |
|---|---|---|
| $data.v | # 1 | return scalar |
| $data.items | # [{id:2},{id:3}] | return array of objects |
| $data.items.0.id | # 2 | return scalar |
| $data.items.id | # [2,3] | traverse array and return array of scalars |

There is also an alternative selection syntax that uses the "get" filter. The general syntax for filters is:

variable|filter:arg1:arg2:argN

The filter would bind to the variable and have an optional number of arguments separated by a colon. Each filter can be defined with a given number of arguments. Filters can be chained together with other filters by being separated with the pipe character "|" although other characters may be used in other examples.

The get filter has one argument and binds to a value referenced via its path parameter. While the get filter is more verbose in syntax than the inline dot notation, the get filter can be useful when trying to express the data retrieval operation using only filters. The get filter is also relevant when looking at its set counterpart.

Using the same variable data referenced in the previous example, a list of examples using the get filter and pipes are listed below:

| | | |
|---|---|---|
| $data\|get:v | # 1 | return scalar |
| $data\|get:items | # [{id:2},{id:3}] | return array of objects |
| $data\|get:items.0.id | # 2 | return scalar |
| $data\|get:items.id | # [2,3] | traverse array and return array of scalars |

FIG. 4 illustrates the use of the set filter combined with a transformation, according to some examples. Selection and transformation may be combined, where transformations return the original data regardless of where the transformation is taking place. This allows chaining.

The set filter leverages the targeting mechanism of the get filter and allows the transformation of the data that is retrieved. The set filter is similar to the get filter in terms of referencing what data is being selected. Still, the set filter has an additional parameter, which is the expression used for the transformation process to assign a value to the variable. Thus, set has two arguments, and "set:path:value" is the syntax.

It is noted that after the transformation, the complete object (not just what got changed) is returned. By doing so, it allows for this process to be repeated as many times as needed to complete desired transformations.

Below are examples based on the variable data, which is equal to {v:1,items:[{id:2},{id:3}]}.

| | |
|---|---|
| $data\|set:v:10 | # {v:10,items:[{id:2},{id:3}]} |
| $data\|set:items:[ ] | # {v:1,items:[ ]} |
| $data\|set:items.0.id:8 | # {v:1,items:[{id:8},{id:3}]} |
| $data\|set:items.id:9 | # {v:1,items:[{id:9},{id:9}]} |

In the first example, set selects the variable v and makes its value equal to 10. In the second example, the values of data.items are set to null or empty. In the third example, the first item within items is set to 8, and in the last example, all the items in items are set to 9.

Multiple set filters may be used for multiple transformations. An example data payload, referenced here as exampledata1, is used for illustration purposes and used in several examples.

```
exampledata1=
{
  "v": 10,
  "items": [
    {
      "id": 1,
      "name": "s1",
      "score": 100,
      "tags": [
        {"tag":"beta","weight":5},
          {"tag":"test","weight":50}
      ]
    },
    {
      "id": 2,
      "name": "x9",
      "score": 87,
      "tags": [
        {"tag":"abc","weight":10},
          {"tag":"def","weight":90}
      ]
    }
  ]
}
```

Below are some examples using the set filter with exampledata1:

1. To change the value of "v" to 50, the expression set:v:50 can be used. The user may enter this information in different fields of the IU as follows:

set:

path: v value: 50

The result is exampledata1 with v equal to 50, that is {"v": 50, . . . }

2. To change the value of all IDs in the array items to 99, set:items.id:99 may be entered in the UI as follows:

set:

path: items.id value: 99

The result is:

```
{
  "v": 10,
  "items": [
    {
      "id": 99,
      "name": "s1",
      "score": 100,
      "tags": [
        {"tag":"beta","weight":5},
          {"tag":"test","weight":50}
      ]
    },
    {
      "id": 99,
      "name": "x9",
      "score": 87,
      "tags": [
        {"tag":"abc","weight":10},
          {"tag":"def","weight":90}
      ]
    }
  ]
}
```

3. To add 1 to all item ids, the following inputs may be entered in the UI:

set:

path: items.id value: $$+1

The result is:

```
{
  "v": 10,
  "items": [
    {
      "id": 2,
      "name": "s1",
      "score": 100,
      "tags": [
        {"tag":"beta","weight":5},
          {"tag":"test","weight":50}
      ]
    },
    {
      "id": 3,
      "name": "x9",
      "score": 87,
      "tags": [
        {"tag":"abc","weight":10},
        {"tag":"def","weight":90}
      ]
    }
  ]
}
```

4. To convert all item tag's to uppercase, the following inputs may be entered in the UI:

set:

path: items.tags.tag value: $$|to_upper

The result is:

```
{
  "v": 10,
  "items": [
    {
      "id": 1,
      "name": "S1",
      "score": 100,
```

-continued

```
      "tags": [
        {"tag":"BETA","weight":5},
          {"tag":"TEST","weight":50}
      ]
    },
    {
      "id": 2,
      "name": "X9",
      "score": 87,
      "tags": [
        {"tag":"ABC","weight":10},
          {"tag":"DEF","weight":90}
      ]
    }
  ]
}
```

5. To add the value of an input to each tag weight, the following inputs may be entered in the UI:

```
set:
  path: items.tags.weight
  value: $input.add+$$
  input: {
    add: 500
  }
```

The result is:

```
{
  "v": 10,
  "items": [
    {
      "id": 1,
      "name": "S1",
      "score": 100,
      "tags": [
        {"tag":"BETA","weight":505},
        {"tag":"TEST","weight":550}
      ]
    },
    {
      "id": 2,
      "name": "X9",
      "score": 87,
      "tags": [
        {"tag":"ABC","weight":510},
          {"tag":"DEF","weight":590}
      ]
    }
  ]
}
```

6. To add a new total_weight key for each item that contains the sum of all tag weights, the following inputs may be entered in the UI:

set:

path: items.total_weight value: $1.tags.weight|sum

The result is:

```
{
  "v": 10,
  "items": [
    {
      "id": 1,
      "name": "S1",
      "score": 100,
```

-continued

```
        "tags": [
            {"tag":"BETA","weight":5},
            {"tag":"TEST","weight":50}
        ],
        "total_weight": 55
    },
    {
        "id": 2,
        "name": "X9",
        "score": 87,
        "tags": [
            {"tag":"ABC","weight":10},
            {"tag":"DEF","weight":90}
        ],
        "total_weight": 100
    }
  ]
}
```

Figure 5:
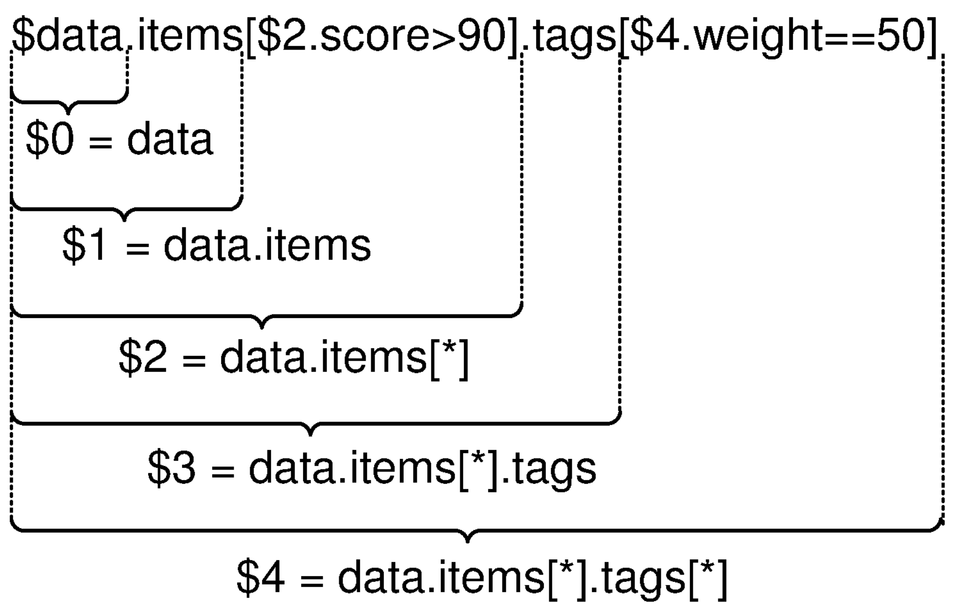
FIG. 5 illustrates the use of a special variable to reference items in a variable, according to some examples.

FIG. 5 illustrates the use of a special character "$" to reference items in an expression, according to some examples. The elements in the expression can be selected using "$" followed by the ordinal number of the element (referred to herein as n) in the expression using zero indexing. Thus, $n accesses the $n^{th}$ element in the expression, and the first element of the expression is $0, the second is $1, etc.

Using the data exampledata1 described above, an example is expression, called expression1, is defined as:

$data.items[$2.score>90].tags[$4.weight==50]

Going from left to right in expression1, the first element is data, so $0 refers to data because zero indexing is used. The next element is data.items; therefore, $1 is equal to data.items. Continuing from left to right, the next referenced item is data.items[ . . . ]; therefore, $2 is equal to data.items [*], where [*] refers to all the elements in the array.

Conditional retrieval is possible by using the expression syntax within the array brackets of an item. In this example, the next referenced item is data.items[*].tags; therefore, $3 is equal to data.items[*].tags. The condition "$2.score>90" inside data.items[*] is used to select elements within data.items[*] that have a score greater than 90; in this case, this selection is the first element of the array because it has a score of 100 which is greater than 90.

Continuing from left to right, the next element is $3, which is equal to data.items[*].tags, and $4 is equal to data.items[*].tags [*]. Further, the selector $4.weight==50 is used to select tags with a weight that is equal to 50, which, in this example, is the second tag within the array of tags. Since the first filtering selected the first element of array items, the result of executing this expression would be ["tag":"test", "weight":50].

Therefore, fields within a data structure may be referenced without having to include the name of the field itself by using the special syntax with the $ sign to access elements of the input. This results in more compact code and not having to enter the names of variables or fields repeatedly. Although examples are described with reference to the dollar sign, other implementations may use other symbols, or a sequence of symbols, as the special character. Also, the meaning of the $n construct depends on where the construct is used within an expression, as the construct is associated with the element being accessed.

Figure 6:
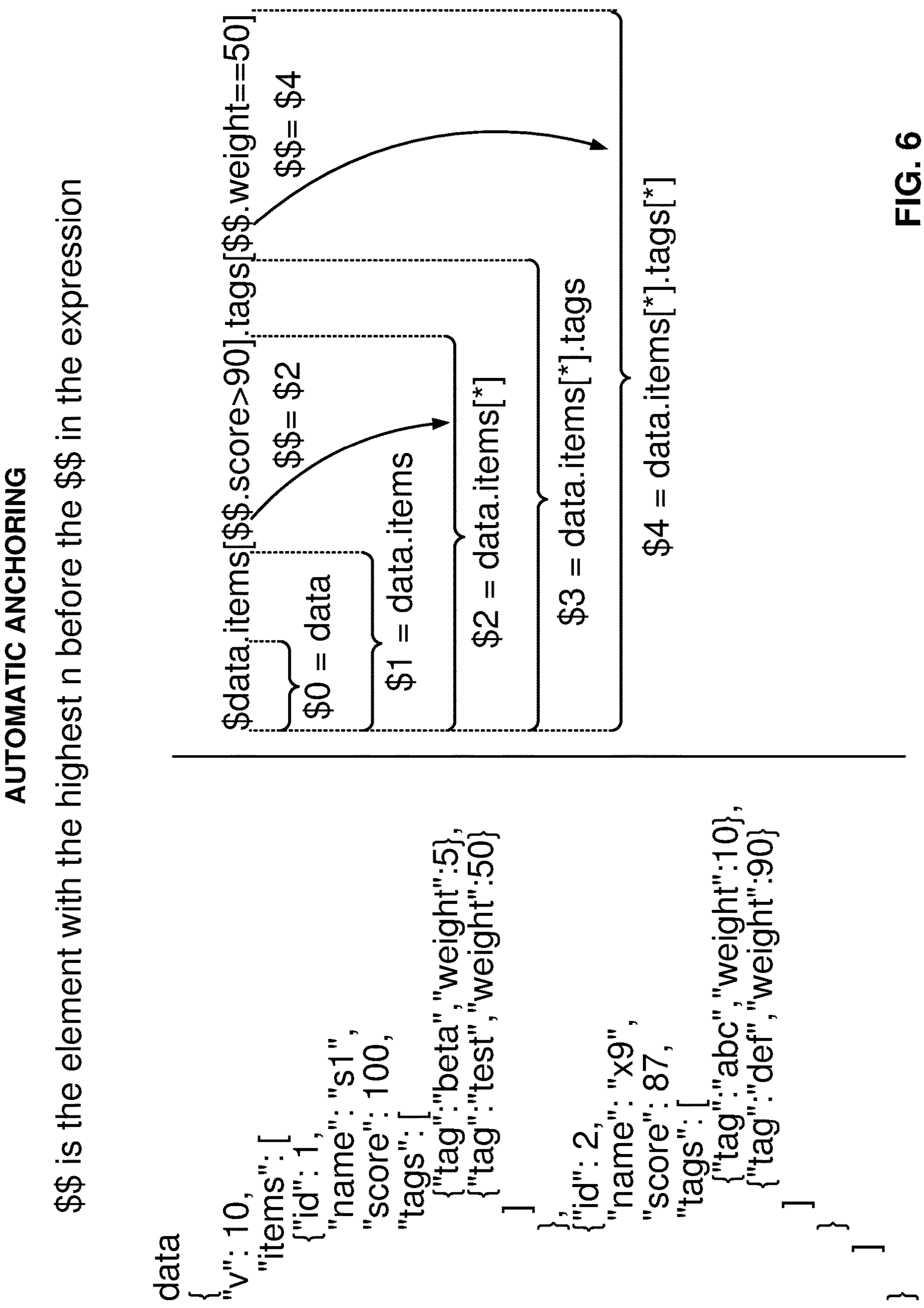
FIG. 6 illustrates the use of automatic anchoring according to some examples.

FIG. 6 illustrates the use of automatic anchoring according to some examples. Another use of the special character $ is for a feature called automatic anchoring, which is utilized by the special anchoring sequence "$$." The special sequence $$ refers to the element with the highest ordinal n that precedes the use of the special sequence. That is, the $$ special anchoring represents the top most numerically indexed special variable that is available within its context.

An equivalent expression of exampledata1 described above is the following expression2 defined using $$ as follows:

$data.items[$$.score>90].tags[$$.weight==50]

The use of the anchoring sequence eases the burden on the user of having to determine which n to use in an expression for some cases. When the user wants to refer to the last item referenced in the expression up to the point where the user is creating the expression, the user can just use $$ to eliminate the step of having to count the ordinal number in the expression. This feature not only saves time for the user but also eliminates potential errors if the user miscounts.

Thus, in expression2, the use of $2 in the filter "$2.score>90" can be replaced by $$ because, in this case, $2 refers to the previous element in the expression. Similarly, $4 in the filter "$4.weight==50" can be replaced with $$. Here are some other examples based on the variable exampledata1:

items[$$.id>1].tags[$$.weight>=90].tag # result ["def"]

items[$2.id>1].tags[$$.weight>=90].tag # result ["def"]

items[$$.id>1].tags[$4.weight>=90].tag # result ["def"]

items[$2.id>1].tags[$4.weight>=90].tag # result ["def"]

items[$$.id>1].tags[$$.weight>=$0.v].tag # result ["abc", "def"]

items[$$.id>([$0.v,2,3]|max)].id # result [ ]

items[$$.id>([$0.v,2,3]|min)|$$.id==1].id # result [1,3]

FIG. 7 illustrates the syntax for pipes, according to some examples. Pipes chain functions where the structure of the initial input is passed along the chain of functions, and each function may access, transform, and select values inside the initial input. Pipes can be applied to identifiers or constants and chained together through the "|" character.

The first element in a chain of pipes is the input, which can be any variable, such as an array of items. The input is passed to a function that may access, transform, and select values from the initial input. For example, if the function sets a value within the input, the output from the function will be the initial input variable with the changed value.

Here are a few examples of using pipes.

| | |
|---|---|
| "sean"\|upper | # SEAN |
| "sean"\|upper\|at:0 | # S |
| "sean"\|upper\|at:0\|lower | # s |

In the first example, sean input is passed to function upper that uppercases the input, so the result is "SEAN." In the second example, a new filter at:0 is added to the chain to select the first element, and since the passed input is "SEAN" (after uppercasing "sean") the result is the first character "S." In the third example, a new function lower is chained to lowercase the input, and the result is "s."

Arguments of pipes can be wrapped within parentheses. For example,

"sean"|upper|at:(0|inc)|lower # e

In this example, the array selector is increased by one, which means selecting the second element (based on 0 indexing) from "sean," and the result is "e."

Nested conditional selection allows the selection of data within the pipe chain based on conditions. The condition is included within square brackets in the pipe. For example, given the following variable:

```
# Data definition
var data = {
  v: 1,
  alias: "sean",
  items: [{
    id: 1,
    name: "apple",
    score: 90,
    tags: [{tag:"brown",weight:10},{tag:"silver",weight:20}]
  }, {
    id: 2,
    name: "pear",
    score: 100,
    tags: [{tag:"red",weight:30},{tag:"gold",weight:40}]
  }]
}
```

To retrieve all tags from a single array with an item that is greater than 95, the following instruction can be used:

$data.items[$$.score>95].tags.tag # Result is transformed Data

#["red","gold"]

Thus, the operation may be performed using a single-line chain with CTF. On the other hand, a program to perform the same operations in JavaScript would be substantially longer, such as:

```
var result = [ ];
data.items.forEach((item) => {
    if (item.score > 95) {
        item.tags.forEach((tag) => {
            result.push(tag.tag);
        });
    }
});
```

return result;

Another way to accomplish the same result would be using a single get filter as follows:

$data.items|get:[$$.score>95].tags.tag

Further, using multiple get filters, the instruction would be:

$data|(get:items)|(get:[$$.score>95])|get:tags.tag

Transformations using the set filter return the original data regardless of where the transformation is taking place, which allows chaining. For example, using the variable data equal to {v:1,items:[{id:2},{id:3}]}, the following may be used:

```
$data
  |set:v:10
  |set:items.0.id:8 # {v:10,items:[{id:8},{id:3}]}
```

The result of the first set is to assign the value of v to 10; then data is passed to the next pipe operation where the id in the first element of items is set to 8.

Thus, pipes in CTF are different than pipes in other programming languages. For example, in JavaScript, Pipes chain together functions so that the output of one function is passed as the input to the next function. However, there is no correlation between the input and the input in a chain and the output beyond what the function is defined to produce as the output. For example, a function could take a text string as input and return the time of the day as output, which is unrelated to the input.

In some examples, the pipes in CTF do not produce outputs that are unrelated to the input; that is, the output of the CTF pipe is directly related to the input, and the structure of the output is equal to the structure of the input or equal to a transformation in the pipe of the structure of the input. The output of a CTF pipe is based on the input, where the output can be equal to the input, equal to the input after one or more values in the input are modified, equal to a selection of all or part of the input, or any combination thereof. That is, the structure of the output of the CTF pipe is equal to the structure of the input or equal to a structure that is equal to a modification of the structure of the input.

Here are a few additional examples:

```
$data|set:v:10+1*2          # {v:12,items:[{id:2},{id:3}]}
$data|set:v:$$+10+1*2       # {v:13,items:[{id:2},{id:3}]}
                            # $$ is v
$data|set:items.id:10       # {v:1,items:[{id:10},{id:10}]}
$data|set:items.id:10*$$    # {v:1,items:[{id:20},{id:30}]}
                            # $$ is items.id
$data|set:v:$$+10           # {v:11,items:[{id:2},{id:3}]}
$data|set:v:$0+10           # {v:11,items:[{id:2},{id:3}]}
```

In the first example, the set filter is used to access the v field and set its value to the expression (10+1*2), which is 12. Thus, the result is the complete variable data with v set to 12. In the second example, $$ means the first field, so v is set to the value of v plus 12. In the third example, set is used to assign items.id the value of 10. In the fourth example, set is used to multiply items.id by 10. In the fifth example, 10 is added to v using $$, and in the last example, 10 is added to v also using $0.

The CTF syntax is similar to how the solution to a problem is described to a person. Also, the powerful primitives to handle arrays, including selection and transformation, simplify coding, and often eliminating the need for flow loops. The CTF syntax described herein helps in solving several technical problems in software development:

- Verbosity: Older languages or frameworks often require developers to write lengthy code for simple operations. With the improved CTF syntax, the same operations can be achieved with fewer lines, making code more readable and maintainable.
- Ambiguity: Ambiguous syntax can lead to misinterpretations by developers and unexpected behaviors in programs. Clearer syntax can reduce such ambiguities, making code behavior more predictable.
- Error Proneness: Certain coding patterns can be prone to errors. The CTF syntax often introduces safer patterns and ways to express operations, reducing the risk of mistakes.
- Inefficient Memory Management: The CTF programs require less space. Therefore, memory usage is reduced, which helps improve the operation of the computer system.
- Poor Integration Capabilities: Improved syntax can offer better ways to integrate with other systems, libraries, or frameworks, making interoperability smoother.
- Lack of Expressiveness: Older syntax might not be expressive enough to capture complex operations or patterns naturally. The CTF syntax can provide more expressive power, making code more intuitive.
- Inefficient Iteration: Traditional loop structures might not be the most efficient way to iterate over modern data structures. The enhanced CTF syntax can introduce more efficient iteration constructs tailored for specific data types.
- Hard-to-Debug Constructs: Some older coding constructs can be challenging to debug. The improved syntax might introduce more transparent constructs, making the debugging process more straightforward.

FIG. 8 illustrates a complex example that uses the CTF syntax, according to some examples. This example involves performing several operations on the input variable. In this example, the input is as follows:

"data"={v:1,items:[{id:2,name:"a"},{id:3,name:"b"}, {id:4,name:"c"}]}

The task is to perform the following operations: 1. increment v by 10; 2. filter the items array to include items with an id greater than or equal to 3; 3. upper case name entry of each item; and 4. transform the array items into an array of objects of just name. The CTF code would be as follows:

```
$data
  |set:v:$$+10
  |set:items:($$|filter:$$.id>=3)
  |set:items.name:($$|upper)
  |set:items:($$|pick:["name"]) #
```

And the result is {v:11,items:[{name:"B"},{name:"C"}] }. Therefore, the first operation modifies one of the values of data, data.v, which is accessed as $$v. The second operation does filtering, which is a transformation of the initial input data, and the result of the second operation is {v:11,items: [{id:3,name:"b"}, {id:4,name:"c"}]}, that is, the first element in the array items has been filtered out or eliminated.

The third operation is an alteration of the values for items.name, and the output of the third operation would be {v:11,items:[{id:3,name:"B"}, {id:4,name:"C"}]}. Finally, the fourth operation accesses items and uses the pick function to select the subset name from the input so that the final result would be:

{v:11,items:[{name:"B"},{name:"C"}]}

The pick filter is used to return a copy of an object that contains only the specified properties and is often used to filter out unwanted properties from an object or to create a subset of an object with only the properties that are needed.

This example is an excellent example to show the continuous transformation property of the CTF pipes, where several functions can be piped together, and each function does a respective transformation. It should be noted that the present method allows for the manipulation of data systematically and efficiently, enabling complex transformations to be performed step-by-step, thereby enhancing the manageability of the overall process.

The next example is for a nested-select pipe. The input data has the following structure:

```
var data = {
  v: 1,
  alias: "sean",
  items: [{
    id: 1,
    name: "apple",
    score: 90,
    tags: [{tag:"brown",weight:10},{tag:"silver",weight:20}]
    }, {
    id: 2,
    name: "pear",
    score: 100,
    tags: [{tag:"red",weight:30},{tag:"gold",weight:40}]
  }]
}
```

The goal of the code is to retrieve all of the tags into a single array.

The CTF instruction and the result would be:

$data.items.tags.tag #["brown", "silver", "red", "gold"]

A sample JavaScript program would be much longer and require for loops, as follows:

```
var result = [ ];
data.items.forEach((item) => {
  item.tags.forEach((tag) => {
    result.push(tag.tag);
  });
});
return result;
```

FIG. 9 illustrates another complex example that uses a multi-step transform, according to some examples. This example involves performing several operations on the input variable.

In this example, the input is as follows:

```
var data = {
  v: 1,
  alias: "sean",
  items: [{
    id: 1,
    name: "apple",
    score: 90,
    tags: [{tag:"brown",weight:10},{tag:"silver",weight:20}]
  }, {
    id: 2,
    name: "pear",
    score: 100,
    tags: [{tag:"red",weight:30},{tag:"gold",weight:40}]
  }]
}
```

The task is to perform the following operations: 1. increment v by 10; 2. filter the items array to include items if id greater than or equal to 2; 3. upper case name entry within items; 4. transform the tags array into an array of objects of just tag in uppercase if the weight is greater than 35. The CTF code would be as follows:

```
$data
  |set:v:$$+10
  |set:items:($$|filter:$$.id >= 2)
  |set:items.name:($$|upper)
  |set:items.tags:(
    $$|filter:$$.weight>35|pick:["name"]|set:name:($$|upper)
)
```

Therefore, the first operation increments v by ten, and $$ means the field v. The second operation sets items and filters items.id to select those that are greater than or equal to 2. The third line uppercases items.name. Finally, the fourth line filters items greater than 35 and selects the tag objects.

The final output would be the modified data as follows:

```
var data = {
    v: 11,
  alias: "sean",
    items: [{
    id: 2,
    name: "PEAR",
    score: 211,
    tags: [{tag:"GOLD"}]
    }]
}
```

A sample JavaScript program would be much longer, such as the following example:

```
data.v = data.v + 10;
data.items = data.items.filter((item) => {
    return item.id >= 2;
});
data.items = data.items.map((item) => {
    item.name = item.name.toUpperCase( );
    item.tags = item.tags.filter((tag) => {
      return tag.weight > 35;
  });
    item.tags = item.tags.map((tag) => {
    return XanoPipe.pick(tag, ["name"]);
  });
    return item;
});
return data;
```

Figure 10:
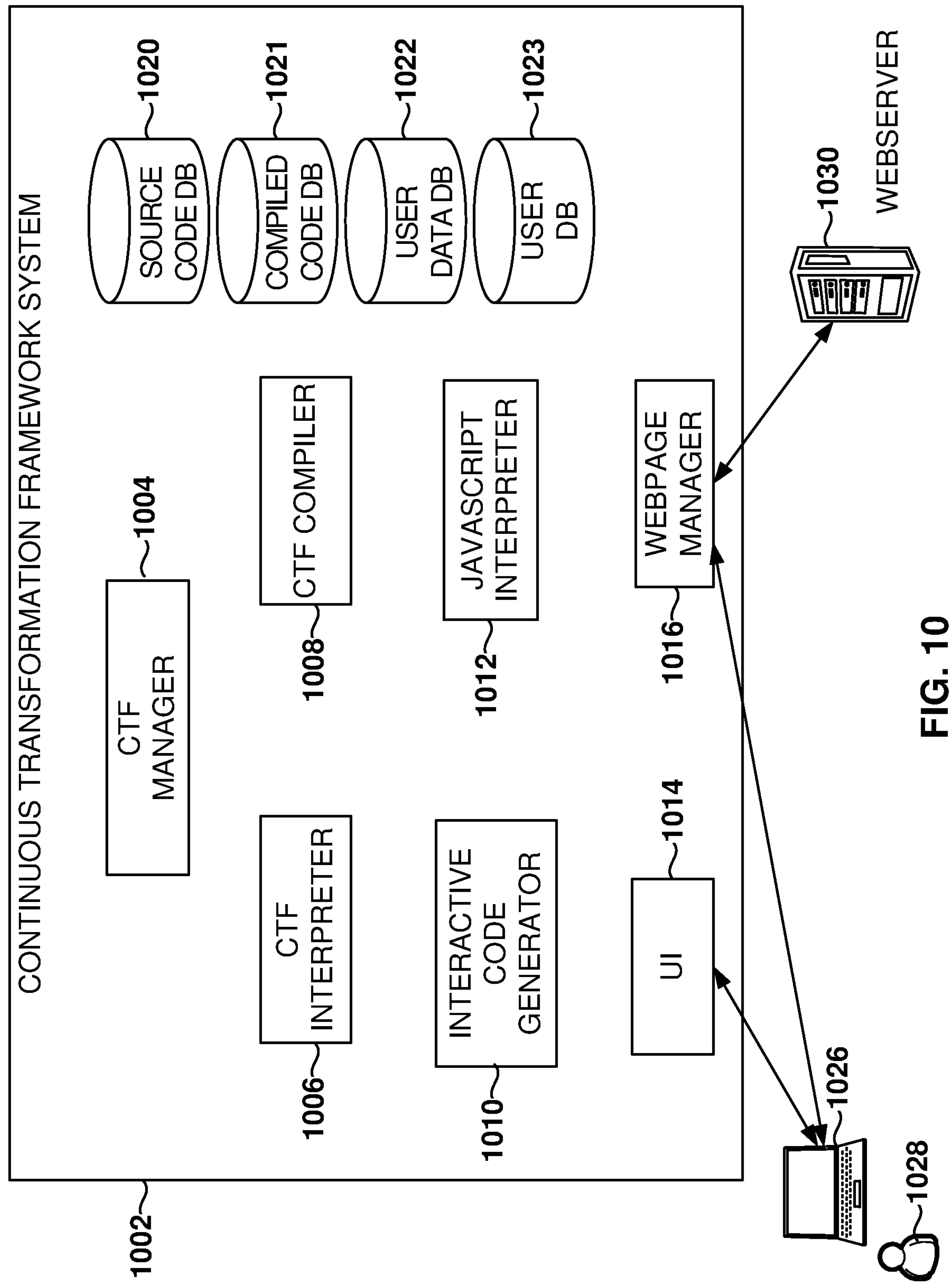
FIG. 10 is a simplified schematic diagram of a computer system for implementing the embodiments described herein.

FIG. 10 is a simplified schematic diagram of a computer system for implementing the examples described herein. The CTF system 1002 includes a CTF manager 1004, a CTF interpreter 1006, a CTF compiler 1008, a code generator 1010, a JavaScript interpreter 1012, a user interface (UI) 1014, a webpage manager 1016, and several data repositories including a source code database 1020, a compiled code database 1021, a user data database 1022, and a user database 1023.

The CTF manager 1004 coordinates the operations of the CTF system 1002, including interactions with the users and the different components.

The CTF interpreter 1006 is an interpreter for CTF code, and the CTF compiler 1008 is a compiler for CTF code. Thus, the CTF syntax may be used for compilation or interpretation.

The interactive code generator 1010 is a tool that interfaces with a user device 1026 (associated with user 1028) via the UI 1014 for the generation of CTF code, such as in the example described above with reference to FIG. 1A.

The JavaScript interpreter 1012 may interact with the different modules of the CTF system 1002. In some examples, a user may utilize segments of code with CTF syntax and other segments in JavaScript, and the combination may be processed by the CTF system 1002. The webpage manager 1016 manages the interaction via web browser with user devices 1026.

The source code database 1020 stores source code created by users, such as CTF code. The compiled code database 1021 stores compiled code. The user data database 1022 stores data of users, and the user database 1023 keeps information about the users of the system.

The CTF system 1002 may also include other components, such as debuggers, text editors, an Integrated Development Environment (IDE) that includes a text editor, debugger, compiler, and other tools to help programmers develop software more efficiently, libraries, operating systems, etc.

It is noted that the examples illustrated in FIG. 10 are examples and do not describe every possible embodiment. Other embodiments may utilize different modules, combine modules, break modules into several submodules, perform the operations on a distributed system across multiple machines, etc. The embodiments illustrated in FIG. 10 should, therefore, not be interpreted to be exclusive or limiting but rather illustrative.

Figure 11:
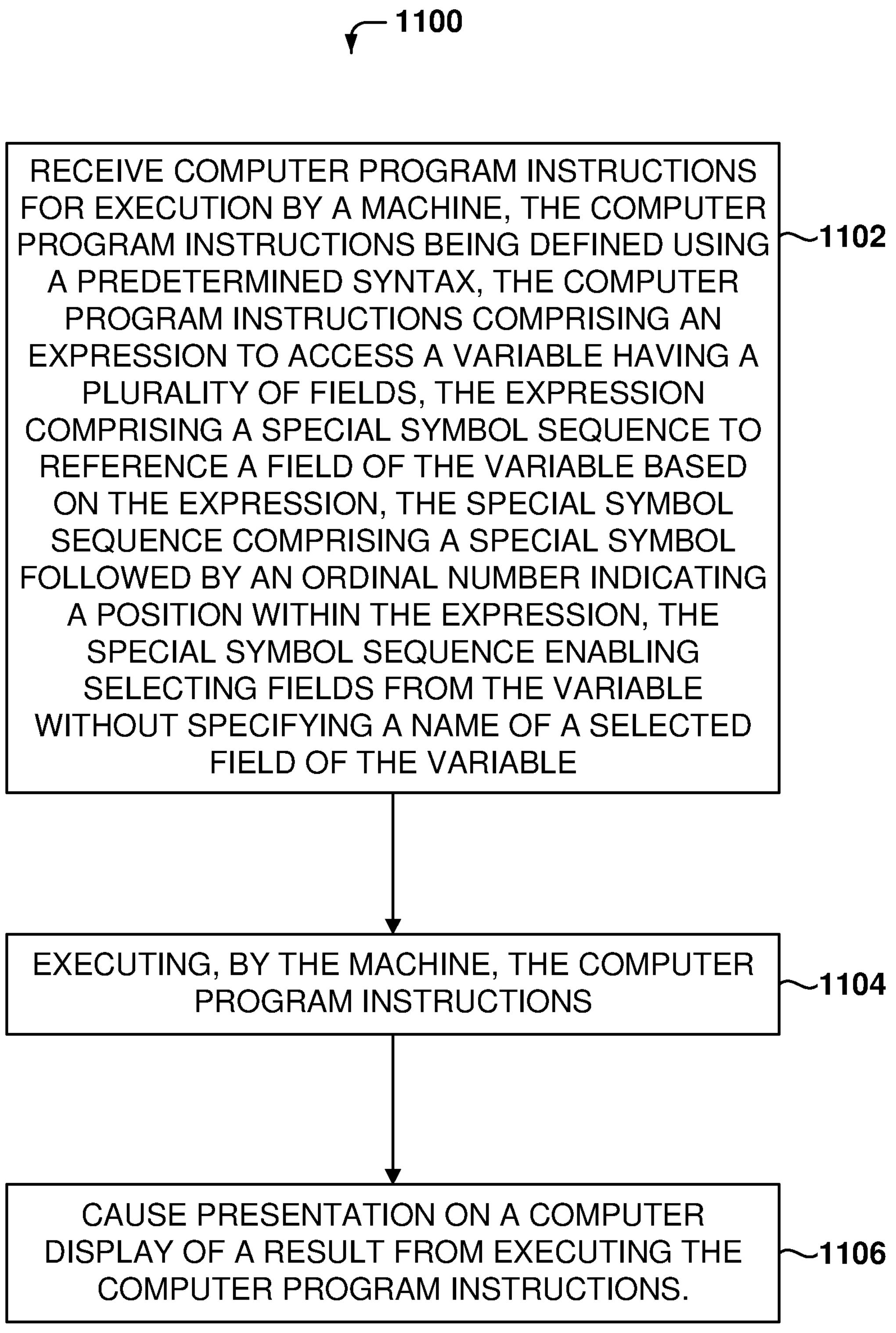
FIG. 11 is a flowchart of a method for the use of a syntax framework for data transformation, according to some examples.

FIG. 11 is a flowchart of a method 1100 for the use of a syntax framework for data transformation, according to some examples. While the various operations in this flowchart are presented and described sequentially, one of ordinary skill will appreciate that some or all of the operations may be executed in a different order, combined, omitted, or executed in parallel.

Operation 1102 is for receiving computer program instructions for execution by a machine, the computer program instructions being defined using a predetermined syntax. The computer program instructions comprise an expression to access a variable having a plurality of fields, and the expression comprises a special symbol sequence to reference a field of the variable based on the expression. Further, the special symbol sequence comprises a special symbol followed by an ordinal number indicating a position within the expression, where the special symbol sequence enables selecting fields from the variable without specifying a name of a selected field of the variable.

From operation 1102, the method 1100 flows to operation 1204 to execute, by the machine, the computer program instructions.

From operation 1104, the method 1100 flows to operation 1206 for causing presentation on a computer display of a result from executing the computer program instructions.

In one example, the expression comprises an anchoring sequence for referencing a field of the variable based on the expression. The anchoring sequence is a fixed text sequence, and the anchoring sequence refers to the field in the expression having the highest ordinal number before the anchoring sequence.

In one example, the expression includes a first anchoring sequence and a second anchoring sequence, wherein the first anchoring sequence and the second anchoring sequence have the same name but refer to different fields of the variable.

In one example, the expression comprises a pipe operation, where the pipe operation passes an input to a function that returns an output equal to a transformation of the input performed by the function.

In one example, the output is equal to one of the input, the input after one or more values in the input are modified, or a selection of all or part of the input.

In one example, the expression comprises a chain of several pipe operations, where each function associated with a respective pipe operation receives the input after the input is transformed by a previous function in the chain.

In one example, the expression comprises a select and transform operation that selects a field of the variable and assigns a new value to the selected field of the variable.

In one example, the expression includes a condition to select one or more fields from the variable based on the condition.

In one example, the method 1100 further comprises providing a user interface (UI) to enter the expression.

In one example, the UI includes an option for entering a filter and fields for entering values for the filter.

Another general aspect is for a system that includes a memory comprising instructions and one or more computer processors. The instructions, when executed by the one or more computer processors, cause the one or more computer processors to perform operations comprising: receiving computer program instructions for execution by a machine, the computer program instructions being defined using a predetermined syntax, the computer program instructions comprising an expression to access a variable having a plurality of fields, the expression comprising a special symbol sequence to reference a field of the variable based on the expression, the special symbol sequence comprising a special symbol followed by an ordinal number indicating a position within the expression, the special symbol sequence enabling selecting fields from the variable without specifying a name of a selected field of the variable; executing, by the machine, the computer program instructions; and causing presentation on a computer display of a result from executing the computer program instruction.

In yet another general aspect, a non-transitory machine-readable storage medium (e.g., a non-transitory storage medium) includes instructions that, when executed by a machine, cause the machine to perform operations comprising: receiving computer program instructions for execution by a machine, the computer program instructions being defined using a predetermined syntax, the computer program instructions comprising an expression to access a variable having a plurality of fields, the expression comprising a special symbol sequence to reference a field of the variable based on the expression, the special symbol sequence comprising a special symbol followed by an ordinal number indicating a position within the expression, the special symbol sequence enabling selecting fields from the variable without specifying a name of a selected field of the variable; executing, by the machine, the computer program instructions; and causing presentation on a computer display of a result from executing the computer program instructions.

Figure 12:
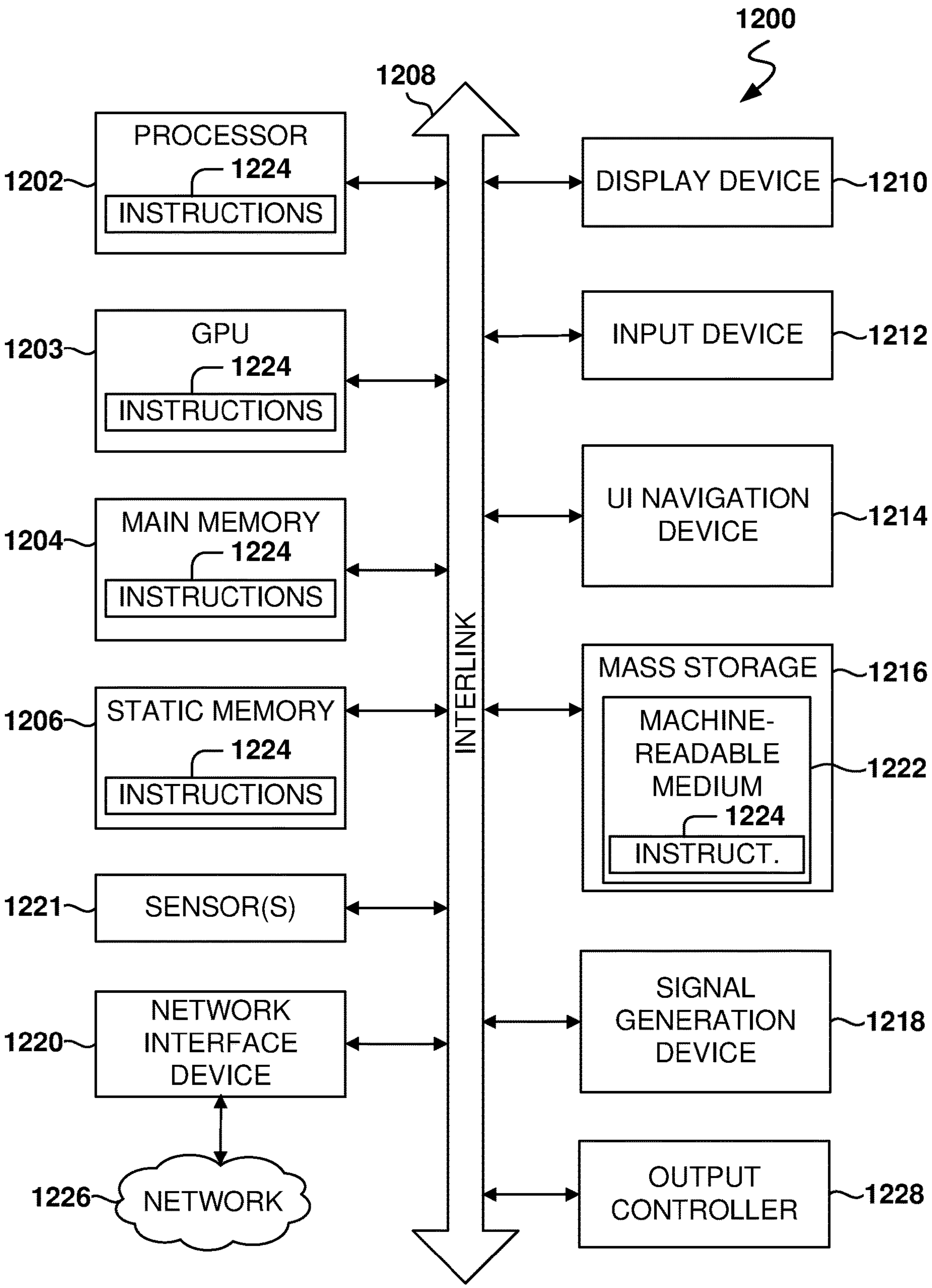
FIG. 12 is a block diagram illustrating an example of a machine upon or by which one or more example processes described herein may be implemented or controlled.

FIG. 12 is a block diagram illustrating an example of a machine 1200 upon or by which one or more example processes described herein may be implemented or controlled. In alternative embodiments, the machine 1200 may operate as a standalone device or be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (Saas), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1200 (e.g., computer system) may include a hardware processor 1202 (e.g., a central processing unit (CPU), a hardware processor core, or any combination thereof), a graphics processing unit (GPU 1203), a main memory 1204, and a static memory 1206, some or all of which may communicate with each other via an interlink 1208 (e.g., bus). The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device 1216 (e.g., drive unit), a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1202 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1202 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1202 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1202 may be emulated in software, running on a physical processor, as a virtual processor or virtual circuit. The virtual processor may behave like an independent processor but is implemented in software rather than hardware.

The mass storage device 1216 may include a machine-readable medium 1222 on which one or more sets of data structures or instructions 1224 (e.g., software) embodying or utilized by any of the techniques or functions described herein. The instructions 1224 may also reside, completely or at least partially, within the main memory 1204, within the static memory 1206, within the hardware processor 1202, or the GPU 1203 during execution thereof by the machine 1200. For example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium or multiple media (e.g., a centralized or distributed database and associated caches and servers) configured to store one or more instructions 1224.

The term "machine-readable medium" may include any medium that is capable of storing, encoding, or carrying instructions 1224 for execution by the machine 1200 and that causes the machine 1200 to perform any one or more of the techniques of the present disclosure or that is capable of storing, encoding, or carrying data structures used by or associated with such instructions 1224. Non-limiting machine-readable medium examples may include solid-state memories and optical and magnetic media. For example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

receiving computer program instructions for execution by a machine, the computer program instructions being defined using a predetermined syntax, the computer program instructions comprising an expression to access a variable having a plurality of fields, the expression comprising a special symbol sequence to reference a field of the variable based on the expression, the special symbol sequence comprising a special symbol followed by an ordinal number indicating a position of an element accessed within the expression, the ordinal number corresponding to an indexed count of elements traversed left to right within the expression from a start of the expression up the special symbol sequence, the special symbol sequence enabling selecting fields from the variable without specifying a name of a selected field of the variable;

executing, by the machine, the computer program instructions; and causing presentation on a computer display of a result from executing the computer program instructions.

2. The method as recited in claim 1, wherein the expression comprises an anchoring sequence for referencing a field of the variable based on the expression, the anchoring sequence being a fixed text sequence, wherein the anchoring sequence refers to the field in the expression having a highest ordinal number before the anchoring sequence.

3. The method as recited in claim 2, wherein the expression includes a first anchoring sequence and a second anchoring sequence, wherein the first anchoring sequence and the second anchoring sequence have a same name but refer to different fields of the variable.

4. The method as recited in claim 1, wherein the expression comprises a pipe operation, wherein the pipe operation passes an input to a function that returns an output equal to a transformation of the input performed by the function.

5. The method as recited in claim 4, wherein the output is equal to one of the input, the input after one or more values in the input are modified, or a selection of all or part of the input.

6. The method as recited in claim 4, wherein the expression comprises a chain of several pipe operations, where each function associated with a respective pipe operation receives the input after the input is transformed by a previous function in the chain.

7. The method as recited in claim 1, wherein the expression comprises a select and transform operation that selects a field of the variable and assigns a new value to the selected field of the variable.

8. The method as recited in claim 1, wherein the expression includes a condition to select one or more fields from the variable based on the condition.

9. The method as recited in claim 1, further comprising: providing a user interface (UI) to enter the expression.

10. The method as recited in claim 9, wherein the UI includes an option for entering a filter and fields for entering values for the filter.

11. A system comprising:

a memory comprising instructions; and one or more computer processors, wherein the instructions, when executed by the one or more computer processors, cause the system to perform operations comprising:

receiving computer program instructions for execution by a machine, the computer program instructions being defined using a predetermined syntax, the computer program instructions comprising an expression to access a variable having a plurality of fields, the expression comprising a special symbol sequence to reference a field of the variable based on the expression, the special symbol sequence comprising a special symbol followed by an ordinal number indicating a position of an element accessed within the expression, the ordinal number corresponding to an indexed count of elements traversed left to right within the expression from a start of the expression up the special symbol sequence, the special symbol sequence enabling selecting fields from the variable without specifying a name of a selected field of the variable;

executing, by the machine, the computer program instructions; and causing presentation on a computer display of a result from executing the computer program instructions.

12. The system as recited in claim 11, wherein the expression comprises an anchoring sequence for referencing a field of the variable based on the expression, the anchoring sequence being a fixed text sequence, wherein the anchoring sequence refers to the field in the expression having a highest ordinal number before the anchoring sequence.

13. The system as recited in claim 12, wherein the expression includes a first anchoring sequence and a second anchoring sequence, wherein the first anchoring sequence and the second anchoring sequence have a same name but refer to different fields of the variable.

14. The system as recited in claim 11, wherein the expression comprises a pipe operation, wherein the pipe operation passes an input to a function that returns an output equal to a transformation of the input performed by the function.

15. The system as recited in claim 14, wherein the output is equal to one of the input, the input after one or more values in the input are modified, or a selection of all or part of the input.

16. A non-transitory machine-readable storage medium including instructions that, when executed by a machine, cause the machine to perform operations comprising:

receiving computer program instructions for execution by a machine, the computer program instructions being defined using a predetermined syntax, the computer program instructions comprising an expression to access a variable having a plurality of fields, the expression comprising a special symbol sequence to reference a field of the variable based on the expression, the special symbol sequence comprising a special symbol followed by an ordinal number indicating a position of an element accessed within the expression, the ordinal number corresponding to an indexed count of elements traversed left to right within the expression from a start of the expression up the special symbol sequence, the special symbol sequence enabling selecting fields from the variable without specifying a name of a selected field of the variable;

executing, by the machine, the computer program instructions; and causing presentation on a computer display of a result from executing the computer program instructions.

17. The non-transitory machine-readable storage medium as recited in claim 16, wherein the expression comprises an anchoring sequence for referencing a field of the variable based on the expression, the anchoring sequence being a fixed text sequence, wherein the anchoring sequence refers to the field in the expression having a highest ordinal number before the anchoring sequence.

18. The non-transitory machine-readable storage medium as recited in claim 17, wherein the expression includes a first anchoring sequence and a second anchoring sequence, wherein the first anchoring sequence and the second anchoring sequence have a same name but refer to different fields of the variable.

19. The non-transitory machine-readable storage medium as recited in claim 16, wherein the expression comprises a pipe operation, wherein the pipe operation passes an input to a function that returns an output equal to a transformation of the input performed by the function.

20. The non-transitory machine-readable storage medium as recited in claim 19, wherein the output is equal to one of the input, the input after one or more values in the input are modified, or a selection of all or part of the input.

* * * * *